Sept. 23, 1947. C. W. MULLER 2,427,686
INSTRUMENT LANDING SYSTEM FOR AIRPLANES
Filed June 29, 1943

Patented Sept. 23, 1947

2,427,686

UNITED STATES PATENT OFFICE 2,427,686

INSTRUMENT LANDING SYSTEM FOR AIRPLANES

Carl W. Muller, Osborn, Ohio

Application June 29, 1943, Serial No. 492,660

1 Claim. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in aircraft instrument landing systems, and has for an object, a system for determining landing approach altitudes at which the aircraft should be flown during its landing approach toward a predetermined landing point.

Another object is the provision of radiant energy operated landing approach altitude indicator means for aircraft for indicating predetermined decreasing altitudes at corresponding decreasing distances between the aircraft and a predetermined landing point, at which the aircraft should be flown in order to make a proper landing at said point.

A further object is the provsion of landing approach altitude indicating means for aircraft for simultaneously indicating predetermined landing approach altitudes at which the craft should be flown during a landing approach to a landing point, corresponding predetermined distances from the aircraft to the landing point, and the direction of said landing point during said approach.

A still further object is the provision of scale means, in combination with radiant energy operated direction indicating means on an aircraft, for receiving radiant energy from transmitting means located at a landing field, for indicating the location of the radiant energy transmitting means, in which the said scale means is calibrated in predetermined distances relative to the indicated direction of said transmitting means, corresponding to predetermined landing approach altitudes at which the aircraft should be flown to make a proper landing at a point adjacent said transmitting means.

A still further object is the provision of adjustable scale means, adapted to be associated with radiant energy operated direction indicating compass means on an aircraft, operated by radiant energy received from spaced radiant energy transmitting means located at spaced points, at opposite sides of a predetermined landing point for indicating the angular directional relations between the transmitting means and the aircraft during the approach thereof toward the landing point, and provisions on the adjustable scale for indicating predetermined landing approach altitudes for the aircraft at corresponding relative angular positions of the indicator means during said landing approach, together with adjusting means for the scale to adjust the same relative to the indicating compass means, to compensate for shifting of the indicating compass means when the aircraft is flown angularly toward the landing point under lateral wind drift conditions.

The above mentioned, and other objects and advantages of the invention will become apparent from the following description, taken in connection with the accompanying drawings in which like reference characters refer to like parts in the several figures.

Fig. 1 is a diagrammatic perspective view, illustrating an aircraft equipped with my improved landing altitude indicating device, approaching a landing point on a landing field having spaced radiant energy transmitting means thereon.

Fig. 2 is a diagrammatic view of one form of radiant energy operated direction indicating means, adaptable for use in combination with my improved altitude indicating means.

Fig. 3 is a front elevation of my landing altitude indicating device mounted on an instrument panel and disclosing direction indicating means of slightly different form from that shown in Fig. 2, parts being broken away and shown in section.

Fig. 4 is a diagrammatic perspective view illustrating another form of radiant energy operated direction indicating means for the pointers disclosed in Fig. 3.

Referring to Fig. 1 of the drawings, I indicates a landing field having the usual runways 2, while 3 indicates a landing point for the aircraft when approaching toward two operating transmitters located at opposite sides of the landing point. Radiant energy transmitting antennas 4, 5, 6 and 7 are positioned at the four corners of the landing field at substantially equally spaced distances from the four ends of the runways 2, 2. Transmitting apparatus 4a, 5a and 6a are disposed adjacent the respective antennas 4, 5 and 6 for transmitting radiant energy, preferably of different predetermined frequencies therefrom, and a control station 7a, conveniently located on the landing field I for controlling the operation of the several transmitting devices, control circuits 4b, 5b and 6b being provided, which connect the three transmitters 4a, 5a and 6a with the control station, while the fourth transmitter, for the antenna 7, may be located in the control station. This control station may be the control tower for the field.

The numeral 8 in Fig. 1 of the drawings indicates an aircraft, such as an airplane, approaching the landing field, for a landing at the point 3. The aircraft carries directional antennas indicated at 9 and 10, and any suitable conventional type of radiant energy direction indicating means, for angularly indicating the directional locations of the two spaced radiant energy transmitting antennas 4 and 5, located at the approach edge of the field.

One form of radiant energy operated direction indicating means adaptable for use in my improved system is illustrated in the patent to E. G. Gage, No. 2,255,659, dated September 9, 1941, and a schematic diagram of the receiving circuit of this Gage patent is illustrated in Fig. 2 of the drawings, in which 9 and 10 indicate direction finding loops fixed at any desirable angle on the aircraft, preferably 22½°. These loops are connected through variable inductances 11 and 12, respectively, to tuned condensers 13 and 14 for the respective loops; and two substantially identical conventional Watson Watts cathode ray compass receivers 15 and 16 are connected therewith. The receivers are resistance coupled, and deliver both radio and audio frequency oscillations to the output circuit. The output of each receiver is connected to a corresponding output transformer 17 and 18 having variable shunt resistances 19 and 20 connecting the receiver across the primary of these transformers.

The outputs from the aforesaid receiving apparatus are connected to a cathode ray tube 22 having a directly heated cathode 23, a control grid 24, the first anode 25 and the second anode 26, as well as the horizontal deflecting plates 27 and the vertical deflecting plates 28. A cathode heating battery is indicated at 29 and a grid control battery at 30, while 31 designates the anode No. 1 battery, and 32, one section of the anode No. 2 battery, as is the usual practice except for grounding of the anode 26. Between this section and another section 33 of the same battery are interposed high resistances 34, 35 and 36, each section of the battery being of comparatively low voltage, though adequate to provide ample current flow for operation of the tube.

A local beat frequency oscillator 37, tuned to beat with the incoming signals at any frequency suitable for the reduction of a satisfactory signal line, may be associated with the signal apparatus, as well as a local generator 38 for testing the equality of the receivers and the reference line of the loops 9 and 10. This local wave generator 38 is commonly used to test the equality of a Watson Watts cathode ray compass; and the beat frequency oscillator 37 produces a beat note from incoming continuous waves.

When the aircraft 8 is approaching the landing field 1 with the two transmitting antennas 4 and 5 on the approach edge, at opposite sides of the landing point 3 on the runway 2, the two apparent pointer images 41 and 42 on the screen 39 of the cathode ray tube 22 will point directly toward the transmitting antennas 4 and 5, and the indicating ends thereof will be equally spaced from the reference line 40, inscribed on the screen at the viewing end of the cathode ray tube, providing the approaching aircraft is lined up with the longitudinal axis of the runway.

An adjustable screen 43, mounted on the instrument panel or dash 44 in the aircraft is associated with the viewing end of the said screen, and comprises three adjacent annular indicating bands or rings 45, 47 and 49. The first ring 45 is calibrated in angles, as indicated at 46, representing the angular relation between the two transmitting stations and the aircraft during its approach thereto. The second ring 47 is calibrated, as indicated at 48, in predetermined distances corresponding to the aforesaid angular indications 46, these distances being in feet, between the aircraft and the predetermined landing point 3 for the same. The third ring 49 is calibrated, as indicated at 50, in predetermined landing approach altitudes in feet, relating to corresponding indicated distances 48 on the second ring 47.

The adjustable scale 43 carries a reference line 52, so that the scale may be adjusted to position this line coextensive with the reference line 40 on the screen 39 of the cathode ray tube, when no lateral drift calculations are to be taken care of during the flight of the aircraft toward the landing point.

An indicating scale 53 is inscribed on the instrument panel adjacent the periphery of the adjustable indicating scale 43, so that the same may be adjusted to position the reference line 52 to selected drift angle indications on the scale 53 to compensate for the relative shifting of the two direction indicating images 41 and 42 on the screen 39, or the pointers 58 and 59, when the aircraft is flown angularly, or "crab" fashion toward the landing point, to compensate for lateral drift.

The adjusting means for rotatably adjusting the scales comprises a circular or peripheral rack 54, meshing with an operating pinion 55, carried on a shaft 56, suitably journaled on the dash, and a setting knob 57 is provided in a convenient location of the face of the instrument panel, so that the scale 43 may be readily adjusted by the pilot during flight to compensate for the drift angles of the aircraft during the approach thereof toward the landing point.

In the operation of the device, when the aircraft is coming in for a blind landing, the two transmitters 4a and 5a, adjacent the approach side of the landing field 1 are switched on. The radiant energy operated indicating device in the aircraft will immediately indicate the directional location of these two transmitters. The pilot then steers the aircraft so that the apparent images 41 and 42 on the screen 39 (or the indicating hands or pointers 58 and 59) are equally distant from the reference line 40 and the reference line 52 on the indicating scale, by noting the relative angular relations of the pointers at opposite sides of the aforesaid reference line on the scale 46.

When the pointers are substantially close together during the initial approach of the aircraft toward the landing point, such as the 3000 ft. distance from the landing point, as indicated on the scale 43, the aircraft should be at an altitude of 600 feet, since this is the prescribed landing approach altitude for that particular aircraft when at the 3000 ft. distance from a landing point. As the aircraft approaches the landing point, the two indicators diverge, and the pilot should continuously reduce his altitude to correspond with the indications on the outer ring, or third scale 49. When the pointers are diametrically opposite each other, this indicates that the aircraft is crossing the edge of the landing field, and according to the indications on the scale, disclosed in Fig. 3 of the drawings, the aircraft should be at its minimum safe landing altitude, sufficiently close to the ground for the pilot to see the landing field, which altitude would be around 200 feet or less.

In the event of side drift, where the aircraft is approaching the landing field at an angle, the operating knob 57 is rotated to adjust the scale 43, so that the angular relation between the reference line 52 and the two pointers is equal, after which the landing procedure may be completed as indicated above.

Referring to Fig. 4 of the drawings, disclosing a direct indicating radio compass which may be used in combination with my improved landing system, instead of the cathode ray direction indicator disclosure in Fig. 2, the numerals 58 and 59 denote direction indicating pointers, adapted to register with the indicia 46, 48 and 50 on the adjustable scale 43. The pointer 59 is carried on one end of a sleeve shaft 60, having an armature segment 61 secured to the opposite end thereof.

Directional antennas, or fixed radiant energy receiving loops 62 and 63 are secured to the aircraft in a similar manner to the antenna loops 9 and 10 in Fig. 2, for selectively receiving radiant energy waves of predetermined frequency from the transmitting means 4 and 4a, located at one corner of the landing field. Radiant energy receivers 64 and 65, tuned to the same frequency as the last mentioned transmitting means, are operatively connected to the loops 62 and 63, and the electrical output circuits thereof are respectively connected to the magnet field coils 66 and 67, respectively. The relatively variable output of two receivers 64 and 65 incident to the position of the planes of the loops 62, 63 with respect to the transmitting means 4 and 4a cause the pointer 58 to point toward the transmitting apparatus 4 and 4a, located at one corner of the landing field 1. Any suitable means for stabilizing the pointers 58 and 59 may be employed, such as light hair springs 78, in order to normally hold the two pointers in zero position when the indicating device is not in operation.

The other pointer 59 is fixed to one end of a shaft 77, which extends through the sleeve shaft 60, and has a second armature segment 76 fixed on the other end thereof.

Directional antenna loops 70 and 71 are provided to receive radiant energy waves at a predetermined frequency from a second transmitting means, indicated at 5, 5a, at the other corner on the approach side of the landing field 1. Receivers 64' and 65', tuned to the wave frequency of the second transmitting means 5, 5a, are operatively connected to the loops 70 and 71 to control the current output from the last mentioned receivers to the magnet field coils 74 and 75 of the device to cause the second pointer 59 to point toward the second mentioned transmitting means 5 and 5a. Both pointers 58 and 59 indicate the locations of the respective transmitting stations 4, 4a and 5, 5a, and as seen in Fig. 3, the associated scale 43 indicates the angular relation between the two transmitting stations and the approaching aircraft, the distance from the aircraft to the edge of the landing field, and the predetermined landing approach altitudes for the aircraft during the approach of the aircraft toward the landing point.

In the event of a cross wind, the aircraft is flown parallel to the runway as before, and when the aircraft is headed into the wind enough to compensate for this cross wind, the scale ring 43 is rotated in the opposite direction an equal amount, so that the actual line of flight of the aircraft toward the landing point should coincide with the reference line of the scale 43, with the two pointers for the two transmitting stations occupying equal angular relations with respect to the reference line. Under these conditions the line of flight of the aircraft will be in longitudinal alignment with the center of the runway during the approach.

The angular adjustment of the scale 43 may be initially made when the relative angular relation of the aircraft with respect to the direction of its movement to the ground is known, by setting the reference line 52 to the proper predetermined angle indication on the scale 53.

Having thus described my invention, what I claim as new, and desire to secure by Letters Patent is:

In a radio landing approach system for aircraft employing a pair of radio compasses on the aircraft each adapted to cooperate respectively with one of a pair of ground transmitting stations symmetrically disposed on opposite sides of the axis of the landing runway, indicators actuated by the respective outputs of the radio compasses for indicating by their angular divergence the range of the aircraft from the landing point, a rotatably adjustable dial member associated with said indicators and having indicia thereon to form for each indicator separate calibrated scales of range and corresponding desired altitudes in the landing approach, a stationary scale having drift angle indicia thereon, and means for adjusting said dial member relative to said drift scale and said indicators to compensate for errors of indication resulting from variation in the heading of the aircraft from its actual flight direction with respect to the ground necessary to offset lateral wind drift of the aircraft during landing approach.

CARL W. MULLER.

REFERENCES CITED

The following references are of record in the file of this patent:

UNITED STATES PATENTS

| Number | Name | Date |
| --- | --- | --- |
| 2,116,667 | Chireix | May 10, 1938 |
| 2,034,520 | Leib | Mar. 17, 1936 |
| 2,201,174 | Harding et al. | May 21, 1940 |
| 2,207,709 | Bates | July 16, 1940 |

FOREIGN PATENTS

| Number | Country | Date |
| --- | --- | --- |
| 428,867 | Great Britain | May 16, 1935 |
| 543,638 | Great Britain | Mar. 5, 1942 |
| 104,141 | Australia | June 2, 1937 |